(12) United States Patent
Zhang et al.

(10) Patent No.: US 11,492,070 B2
(45) Date of Patent: Nov. 8, 2022

(54) CARDAN JOINT STEERING TITANIUM ALLOY HAND AND FOOT COOPERATIVELY OPERATED BICYCLE CAPABLE OF BEING RIDDEN WITH ONE LEG

(71) Applicant: WENZHOU SAMCOOL TECHNOLOGY CO., LTD, Wenzhou (CN)

(72) Inventors: Zhixiong Zhang, Zhejiang (CN); Yuren Chen, Zhejiang (CN)

(73) Assignee: WENZHOU SAMCOOL TECHNOLOGY CO., LTD, Wenzhou (CN)

( * ) Notice: Subject to any disclaimer, the term of this patent is extended or adjusted under 35 U.S.C. 154(b) by 495 days.

(21) Appl. No.: 16/611,783

(22) PCT Filed: Apr. 9, 2018

(86) PCT No.: PCT/CN2018/082330
§ 371 (c)(1),
(2) Date: Nov. 7, 2019

(87) PCT Pub. No.: WO2018/188553
PCT Pub. Date: Oct. 18, 2018

(65) Prior Publication Data
US 2020/0255085 A1 Aug. 13, 2020

(30) Foreign Application Priority Data
Apr. 13, 2017 (CN) .......................... 201710240373.X

(51) Int. Cl.
*B62M 1/12* (2006.01)
*B62J 1/28* (2006.01)
(Continued)

(52) U.S. Cl.
CPC .................. *B62M 1/12* (2013.01); *B62J 1/08* (2013.01); *B62J 1/28* (2013.01); *B62K 21/02* (2013.01);
(Continued)

(58) Field of Classification Search
CPC .......... B62M 1/12; B62M 1/36; B62M 23/00; B62M 9/02; B62J 1/08; B62J 1/28;
(Continued)

(56) References Cited

U.S. PATENT DOCUMENTS 4,437,677 A * 3/1984 Ksayian ................... B62M 1/12
 280/240
4,925,200 A * 5/1990 Jones ....................... B62M 1/12
 280/288.1
(Continued)

FOREIGN PATENT DOCUMENTS

| CN | 2219249 Y | 2/1996 |
| CN | 2229405 Y | 6/1996 |

(Continued)

*Primary Examiner* — Tony H Winner
(74) *Attorney, Agent, or Firm* — Muncy, Geissler, Olds & Lowe, P.C.

(57) ABSTRACT

A cardan joint steering titanium alloy hand and foot cooperatively operated bicycle capable of being ridden with one leg comprises a bicycle front wheel, a front wheel fork frame, a bicycle rear wheel, a frame body, a seat cushion assembly, a steering handlebar, paired chain wheels and a rear wheel fork frame. The upper end of a front fork rotating shaft and the lower end of an assisting stem are connected through a cardan joint component, symmetric ratchet wheels are provided on the two sides of the bicycle rear wheel, the paired chain wheels are fixed to the two sides of a frame middle shaft, pedal shaft pins are symmetrically provided on the outer sides of the paired chain wheels, and the paired
(Continued)

chain wheels and the symmetric ratchet wheels are connected through symmetric chains.

6 Claims, 11 Drawing Sheets

(51) Int. Cl.
| | |
|---|---|
| *B62K 21/02* | (2006.01) |
| *B62K 21/18* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/50* | (2006.01) |
| *B62J 1/08* | (2006.01) |
| *B62M 1/36* | (2013.01) |
| *B62L 3/02* | (2006.01) |
| *B62M 9/02* | (2006.01) |
| *B62M 23/00* | (2006.01) |

(52) U.S. Cl.
CPC .............. *B62K 21/18* (2013.01); *B62L 3/026* (2013.01); *B62M 1/36* (2013.01); *B62M 9/02* (2013.01); *B62M 23/00* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/50* (2013.01)

(58) Field of Classification Search
CPC ......... B62K 21/02; B62K 21/18; B62L 3/026; C22C 38/002; C22C 38/06; C22C 38/42; C22C 38/44; C22C 38/50
See application file for complete search history.

(56) References Cited

U.S. PATENT DOCUMENTS

| | | | | |
|---|---|---|---|---|
| 5,280,936 A | * | 1/1994 | Schmidlin | B62M 1/12 280/252 |
| 6,105,985 A | * | 8/2000 | Cosgrave | B62M 1/12 280/304.3 |
| 6,783,139 B1 | * | 8/2004 | Wang | B62M 1/36 280/260 |
| 7,000,934 B1 | * | 2/2006 | Capek | B62M 1/12 280/240 |
| 7,770,908 B1 | * | 8/2010 | Malekpour | B62M 1/20 280/223 |
| 7,967,313 B1 | | 6/2011 | Eggert | |
| 8,448,969 B2 | * | 5/2013 | Heath | B62M 1/12 280/270 |
| 9,056,653 B2 | | 6/2015 | Kim | |
| 9,409,621 B2 | * | 8/2016 | Hunt | B62M 23/02 |
| 2011/0148068 A1 | * | 6/2011 | Hunt | B62M 1/12 280/234 |

FOREIGN PATENT DOCUMENTS

| | | |
|---|---|---|
| CN | 2243429 Y | 12/1996 |
| CN | 2258137 Y | 7/1997 |
| CN | 1169131 A | 12/1997 |
| CN | 201613994 U | 10/2010 |
| CN | 202703816 U | 1/2013 |
| CN | 103748003 A | 4/2014 |
| CN | 203511959 U | 4/2014 |
| CN | 204264397 U | 4/2015 |
| CN | 106864657 A | 6/2017 |
| CN | 107021175 A | 8/2017 |
| CN | 107499442 A | 12/2017 |
| EP | 1 736 402 A2 | 12/2006 |

* cited by examiner

US 11,492,070 B2

CARDAN JOINT STEERING TITANIUM ALLOY HAND AND FOOT COOPERATIVELY OPERATED BICYCLE CAPABLE OF BEING RIDDEN WITH ONE LEG

FIELD OF THE INVENTION

The present invention relates to the field of bicycles, which is classified as B62M in international patent classifications, in particular to a cardan joint steering titanium alloy hand and foot cooperatively operated bicycle capable of being ridden with one leg.

BACKGROUND OF THE INVENTION

Most of the existing ordinary bicycles rely on alternating pedaling of the two legs to achieve movement. Alternating pedaling of left and right feet also causes transient force imbalance. The two hands can only be used for controlling the direction, braking and assisting in keeping body balance. The two hands cannot help the legs at all, and the one-leg disabled cannot be competent at riding. Even for sound people, once one leg or foot is injured, they cannot ride a bicycle. In our daily life, the driving devices of bicycles are all of rotary pedaling type. The mechanism of alternating pedaling of two feet is like a crank and connecting rod mechanism, which produces upper and lower dead points. Therefore, work cannot be done continuously, and there are the disadvantages such as of low efficiency. When the positions of a pedal rod and a chain wheel middle shaft are perpendicular to the ground, the left and right feet cannot produce driving force when pedaling downwards. Only when the positions of the pedal rod and the chain wheel middle shaft are in a horizontal relationship, no idle work will be done. For this reason, someone has designed a buckle type bicycle pedal to make the feed of a rider cling to the pedals at any position of the circumference, for example, in the granted patent No. 201020300738.7; one disadvantage of the buckle type bicycle pedal is that it is difficult to separate the rider and the bicycle in case of an accident. Moreover, only when the feed of the rider are at the downwards pedaling position of the circumference, can it produce the greatest effect on the pedals. In addition to the downwards pedaling position, the feed of the rider can hardly exert force on the pedals. Some people design the round chain wheels as elliptical ones, for example, in the patent No. 201280041248.1, titled Asymmetric Elliptical Chain Wheel for Bicycle, all of which are efforts to improve the speed of the bicycle. In order to allow the two hands to assist the two feet, some people use the hand-held mechanism for the disabled on bicycles, for example, in a hand-foot compound bicycle with double ratchets disclosed in U.S. Pat. No. 9,056,653 B2. However, the hand-held mechanism brings about left and right instability, and still fails to solve the inherent defect that upper and lower dead points are inevitably produced on rotary pedaling type bicycles. The 100-year history of bicycles at home and abroad has proved two points: one is that low-carbon environment-friendly bicycles will never be eliminated; the other is that low-carbon environment-friendly bicycles may definitely be improved creatively. What kind of mechanism is used to control the steering effectively while the two hands assist in applying force is the technical bottleneck of two-hand assisted bicycles.

SUMMARY OF THE INVENTION

The purpose of the present invention is to provide a cardan joint steering titanium alloy hand and foot cooperatively operated bicycle capable of being ridden with one leg, which, by creatively improving the driving force structure, ingeniously coordinating the hands and feet to apply force to continuously drive the circumference of the chain wheel, and adopting a cardan joint steering combined assisting sliding sleeve mechanism, solves the problem pointed out in the background, so as to realize high riding speed.

A cardan joint steering titanium alloy hand and foot cooperatively operated bicycle capable of being ridden with one leg comprises a bicycle front wheel, a front wheel fork frame, a bicycle rear wheel, a frame body, a seat cushion assembly, a steering handlebar, a single dual chain wheel and a rear wheel fork frame, a frame front fork hole and a frame middle shaft hole are provided in the frame body, and a frame middle shaft is rotatably fixed in the frame middle shaft hole. As an improvement, the upper end of the front fork rotating shaft and the lower end of the assisting stem are connected through a cardan joint component, a single dual ratchet wheel is provided on at least one side of the bicycle rear wheel, the single dual chain wheel is fixed to at least one side of the frame middle shaft, pedal shaft pins are symmetrically provided on the outer sides of the single dual chain wheel, and the single dual chain wheel and the single dual ratchet wheel are connected through a single dual chain; the lower end of the assisting stem is fixedly connected with a cardan joint upper joint, the upper end of the front fork rotating shaft is fixedly connected with a cardan joint lower joint, and a cardan joint square block is movably fixed between the cardan joint lower joint and the cardan joint upper joint;

a swinging rod through slot and an assisting support hole seat are provided on a frame upper beam, a swinging rod middle seat hole, a swinging rod upper hole ring and a swinging rod lower fork are provided on an assisting swinging rod, and swinging rod lower seat holes are provided in the swinging rod lower fork; the swinging rod upper hole ring penetrates through the swinging rod through slot, and a swinging rod shaft pin penetrates through the swinging rod middle seat hole and fixes the swinging rod middle seat hole on the assisting support hole seat; a sliding sleeve through hole and a pair of sliding sleeve swinging seats are provided on an assisting sliding sleeve, a sliding sleeve pin hole is provided in each sliding sleeve swinging seat, the sliding sleeve pin hole and the swinging rod upper hole ring are hinged by a sliding sleeve shaft pin, and the sliding sleeve through hole and the assisting stem are in sliding fit; the front and rear ends of the assisting connecting rod are respectively provided with connecting rod assisting holes and connecting rod pedal holes, the swinging rod lower seat holes and the connecting rod assisting holes are hinged by a hand drive shaft pin, and the connecting rod pedal holes and the pedal shaft pins are in rotatable fit;

a rear column seat hole is provided in the upper end of a frame rear column, pull rod lower fork holes and a pull rod upper seat hole are respectively provided in the upper and lower ends of a pull rod swinging fork, a seat sliding rail, sliding rail pin holes and a seat swinging fork are provided on a seat transverse swinging rod, and seat fork pin holes are provided in the seat swinging fork; the rear column seat hole and the seat rod pin hole are hinged by a seat shaft pin; the seat fork pin holes and the pull rod upper seat hole are hinged by a pull rod shaft pin, and the pull rod lower fork holes and the pedal shaft pins are in rotatable fit;

the seat cushion assembly is adjustably fixed at the rear end of the seat transverse swinging rod.

As a further improvement, the seat cushion assembly further comprises a seat sliding groove, sliding groove pin holes and a gravity seat, a seat backrest is provided at the rear end of the gravity seat, and the included angle between the gravity seat and the seat backrest is an obtuse angle of 115-135 degrees; the seat sliding groove and the seat sliding rail are in sliding fit, the sliding groove pin holes and the sliding rail pin holes are selectively aligned, and the sliding groove pin holes and the sliding rail pin holes are fixedly connected through groove-rail shaft pins.

As a further improvement, the front wheel fork frame comprises a front fork hole seat and a front fork rotating shaft, a front brake handle and a rear brake handle are respectively fixed on the two sides of the steering handlebar, and an assisting stem is provided at the lower end of the steering handlebar; the front brake handle is connected to a front brake through a front brake flexible wire, and the front brake is fixed on the front wheel fork frame; the rear brake handle is connected to a rear brake through a rear brake flexible wire, and the rear brake is fixed on the rear wheel fork frame.

As a further improvement, the cardan joint component consists of the cardan joint upper joint, the cardan join lower joint and the cardan joint square block, a transverse shaft pin and a longitudinal shaft pin are provided on the cardan joint square block, a joint upper pin fixes the cardan joint upper joint at the lower end of the assisting stem, a joint upper fork mouth is provided on the cardan joint upper joint, a joint upper pin hole is provided in the joint upper fork mouth, and the joint upper pin hole and the transverse shaft pin are rotatably fixed; a joint lower pin fixes the cardan joint lower joint at the upper end of the front fork rotating shaft, a joint lower fork mouth is provided on the cardan joint lower joint, a joint lower pin hole is provided in the joint lower fork mouth, and the joint lower pin hole and the longitudinal shaft pin are rotatably fixed.

As a further improvement, middle shaft clamping grooves are symmetrically provided in the two sides of the frame middle shaft, middle shaft square columns are provided on the outer sides of the middle shaft clamping grooves, middle shaft studs are provided at the outer ends of the middle shaft square columns on the two sides, and a shaft inner clamping ring is located in the middle shaft clamping grooves and used for restricting axial displacement between the frame middle shaft hole and the frame middle shaft; chain wheel center square holes and chain wheel pedal shaft square holes are provided in the single dual chain wheel, the pedal shaft pins are fixedly fit on the chain wheel pedal shaft square holes; the chain wheel center square holes are fit with the middle shaft square column, middle shaft nuts and the middle shaft studs are in tight fit, and the middle shaft nuts block the single dual chain wheel;

a pedal shaft shoulder is provided on each pedal shaft pin, a pedal fixing screw hole is provided in the outer side end surface of the pedal shaft shoulder, and a pedal fixing screw is fit on the pedal fixing screw hole; the pedal fixing screw and the pedal fixing screw hole are in tight fit to fix the pedal on the pedal shaft pin; a pedal crankshaft surface, a pedal square shaft section and a pedal shaft stud are sequentially provided on the inner side of the pedal shaft shoulder; a connecting rod pedal hole bush is provided on the connecting rod pedal hole, and the inner hole of the connecting rod pedal hole bush and the outer circle of the pedal crankshaft surface are in rotatable sliding fit; a pull rod fork hole bush is provided on the pull rod lower fork hole, and the inner hole of the pull rod fork hole bush and the outer circle of the pedal crankshaft surface are in rotatable sliding fit; an isolating slip ring is located between the connecting rod pedal hole bush and the pull rod fork hole bush and is used to eliminate end face interference; a square hole retaining ring is provided between the step of the pedal crankshaft surface and the single dual chain wheel and is used to reduce end face friction; the chain wheel pedal shaft square holes sleeve the pedal square shaft section, a pedal nut is fit on the pedal shaft stud, and the pedal nut and the pedal shaft stud are in tight fit to fix the single dual chain wheel on the pedal square shaft section.

As a further improvement, a layer of titanium alloy hard material with a thickness of 0.37-0.39 mm is provided on the outer circle of the pedal crankshaft surface, and the titanium alloy hard material consists of the following elements in percentage by weight: 8.4-8.6% of titanium, 7.1-7.3% of copper, 6.4-6.6% of nickel, 5.1-5.3% of molybdenum, 3.7-3.9% of tungsten, 2.4-2.6% of chromium, 0.64-0.66% of carbon, 0.7-0.9% of zinc, 0.1-0.3% of aluminum, and balance of Fe and unavoidable impurities; the impurities comprise the following components in percentage by weight: less than 0.08% of manganese, less than 0.005% of silicon, less than 0.06% of sulfur and less than 0.04% of phosphorus, and the Rockwell superficial hardness number of the titanium alloy hard material is HRC64-66;

the isolating slip ring and the square hole retaining ring are both made of a copper-based powder metallurgy self-lubricating wear-resistant material, which consists of the following components in percentage by mass: 2.7-2.9% of nickel, 2.4-2.6% of graphite, 2.1-2.3% of molybdenum disulfide and balance of copper; the particle size of nickel is 140-160 meshes, the particle size of graphite is 70-80 meshes, molybdenum disulfide is colloidal powder with purity of 96%-98%, and the particle size of copper is 140-160 meshes; and the pressing pressure of the blanks of the isolating slip ring and the square hole retaining ring is 260-280 MPa.

The present invention has the following beneficial effects:

(I) Since the cardan joint component is provided between the upper end of the front fork rotating shaft and the lower end of the assisting stem, in combination with the sliding fit between the sliding sleeve through hole in the assisting sliding sleeve and the assisting stem, the assisting swinging rod and the swinging rod lower fork can be driven to rotate clockwise or anticlockwise with the swinging rod shaft pin as a fulcrum, the assisting connecting rod drives the pedal shaft pin and the single dual chain wheel to rotate with the frame middle shaft as a fulcrum, a creative role is played at the "high position dead point" and "low position dead point" of the conventional bicycles and a creative role is played at the "high position dead point" and "low position dead point" of the conventional bicycles; by providing the cardan joint component, the rider can use two hands to hold the steering handlebar to push forwards or pull backwards, and it will not obstruct the front wheel from turning left or right at any time; in particular, by acting on the seat cushion assembly through the dead weight through the body gravity, the seat transverse swinging rod and the seat cushion assembly can rotate anticlockwise with the seat shaft pin as a fulcrum, the pull rod swinging fork is driven to be "lifted up", and the pedal shaft pin and the single dual chain wheel can rotate anticlockwise with the frame middle shaft as a fulcrum; in the present invention, by additionally providing the cardan joint component, the assisting sliding sleeve, the assisting swinging rod and the assisting connecting rod, the effect that the two hands participate in doing work is realized; and in the present invention, by additionally providing the seat transverse swinging rod and the pull rod swinging fork, the limit that the positions of the two pedals of the conventional bicycle must have a difference of 180 degrees is overcome, it does need the two feet to apply force alternately and it can be ridden by one leg.

(II) Since the seat transverse swinging rod rotates clockwise or anticlockwise with the seat shaft pin as a fulcrum, and the pull rod swinging fork pulls the pedal shaft pin and the single dual chain wheel to rotate upwards with the frame middle shaft as a fulcrum, in combination with the gravity of the rider which acts on the pedal shaft pin through one leg, the pedal shaft pin and the single dual chain wheel are driven to rotate downwards with the frame middle shaft as a fulcrum, the gravity produced when the body stands upright and lowers down and the pushing and pulling force of the two hands transfer smoothly, the joint force is given to the pedal shaft pins to drive the single dual chain wheel to rotate, and not only can the purpose of improving the riding speed be achieved and are the pedal shaft pins on two sides located on the same axis line, but also the left and right shaking caused by the alternating application of force by the left and right feet of the traditional bicycle is thoroughly eliminated; and moreover, since the actions that one leg stands upright and the hip lowers down are performed alternately, in combination with the perfect combination of the pushing and pulling force of the two hands, it also achieves the fitness effect of exercising the abdominal muscles and the entire body.

(III) Since the pedal crankshaft surface is provided between the pedal shaft shoulder and the pedal square shaft section on the pedal shaft pin, and the inner hole of the connecting rod pedal hole bush and the inner hole of the pull rod fork hole bush are in rotatable sliding fit with the outer circle of the pedal crankshaft surface, it is easy and smooth to ride the bicycle; since the square hole retaining ring is provided between the step of the pedal crankshaft surface and the single dual chain wheel, the end friction can be effectively reduced; and since the isolating slip ring is provided between the connecting rod pedal hole bush and the pull rod fork hole bush, it is ensured that end face interference does not occur.

(IV) Since the sliding groove pin holes and the sliding rail pin holes can be selectively aligned and are fixed by the groove rail shaft pins, the seat cushion assembly can be moved forwards and backwards, adjusted and fixed on the seat transverse swinging rod, and thus it is suitable for people with different arm length to ride.

(V) Since a layer of titanium alloy hard material is provided on the outer circle of the pedal crankshaft surface, it is ensured that the pedal crankshaft surface is more wear-resistant; since the isolating slip ring and the square hole retaining ring are both made of a copper-based powder metallurgy self-lubricating wear-resistant material, the end friction can be effectively reduced; and it is lighter and quicker to ride.

(VI) The work done jointly by the hands and feet in the present invention is great, the speed is naturally fast, and the force on the chains is also increased. The advantages of the single dual chain wheel in combination with the single dual chain and the single dual ratchet wheel on at least one side of the bicycle rear wheel are that the model size of the chains is particularly enhanced, it is convenient for the selection of standard parts, and in case that the chain on one side is broken, the bicycle can still be ridden to the maintenance point or destination, the situation that the bicycle needs to be pushed to move because "the chain falls off" on the half way is avoided, and this is especially important for the one-leg disabled.

DESCRIPTION OF THE EMBODIMENTS

Figure 1:
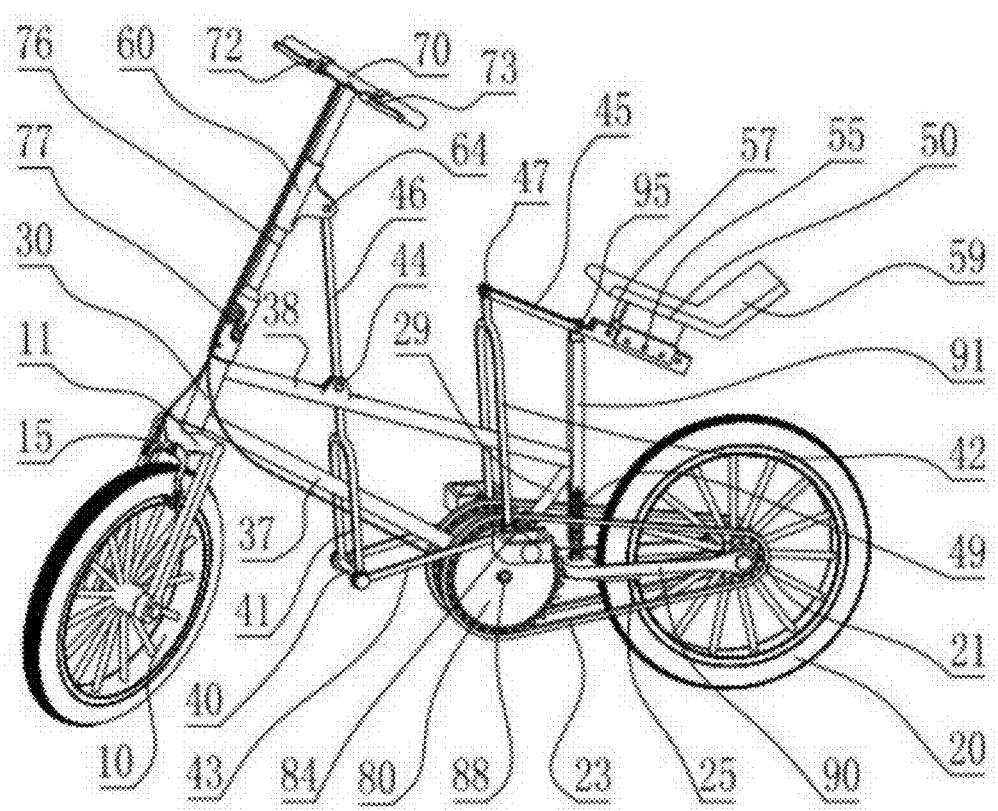
FIG. 1 is a stereoscopic outside view of the present invention, in which a pedal shaft pin 84 is at the highest position of a movement circumference.

A cardan joint steering titanium alloy hand and foot cooperatively operated bicycle capable of being ridden with one leg comprises a bicycle front wheel 10, a front wheel fork frame 11, a bicycle rear wheel 20, a frame body 30, a seat cushion assembly 50, a steering handlebar 70, a single dual chain wheel 80 and a rear wheel fork frame 90, the front wheel fork frame 11 comprises a front fork hole seat 16 and a front fork rotating shaft 13, a front brake handle 72 and a rear brake handle 73 are respectively fixed on the two sides of the steering handlebar 70, and an assisting stem 76 is provided at the lower end of the steering handlebar 70; the front brake handle 72 is connected to a front brake 15 through a front brake flexible wire, and the front brake 15 is fixed on the front wheel fork frame 11; the rear brake handle 73 is connected to a rear brake 25 through a rear brake flexible wire, and the rear brake 25 is fixed on the rear wheel fork frame 90; the frame body 30 comprises a frame upper beam 38, a frame lower beam 37 and a frame oblique column 29, the frame oblique column 29 and the frame upper beam 38 jointly fix a frame rear column 91, the frame body 30 is further connected with the rear wheel fork frame 90, a frame front fork hole 31 is provided between the frame upper beam 38 and the frame lower beam 37, a frame middle shaft hole 33 is provided between the frame lower beam 37 and the frame oblique column 29, and a frame middle shaft 88 is rotatably fixed in the frame middle shaft hole 33. As an improvement, the upper end of the front fork rotating shaft 13 and the lower end of the assisting stem 76 are connected through a cardan joint component 77, a single dual ratchet wheel 21 is provided on at least one side of the bicycle rear wheel 20, the single dual chain wheel 80 is fixed to at least one side of the frame middle shaft 88, pedal shaft pins 84 are symmetrically provided on the outer sides of the single dual chain wheel 80, and the single dual chain wheel 80 and the single dual ratchet wheel 21 are connected through a single dual chain 23;

the lower end of the assisting stem 76 is fixedly connected with a cardan joint upper joint 71, the upper end of the front fork rotating shaft 13 is fixedly connected with a cardan joint lower joint 17, and a cardan joint square block 12 is movably fixed between the cardan joint lower joint 17 and the cardan joint upper joint 71;

a swinging rod through slot 36 and an assisting support hole seat 34 are provided on a frame upper beam 38, a swinging rod middle seat hole 66, a swinging rod upper hole ring 65 and a swinging rod lower fork 41 are provided on an assisting swinging rod 46, and swinging rod lower seat holes 68 are provided in the swinging rod lower fork 41; the swinging rod upper hole ring 65 penetrates through the swinging rod through slot 36, and a swinging rod shaft pin 44 penetrates through the swinging rod middle seat hole 66 and fixes the swinging rod middle seat hole 66 on the assisting support hole seat 34;

a sliding sleeve through hole 67 and a pair of sliding sleeve swinging seats 62 are provided on an assisting sliding sleeve 60, a sliding sleeve pin hole 63 is provided in each sliding sleeve swinging seat 62, the sliding sleeve pin hole 63 and the swinging rod upper hole ring 65 are hinged by a sliding sleeve shaft pin 64, and the sliding sleeve through hole 67 and the assisting stem 76 are in sliding fit;

the front and rear ends of the assisting connecting rod 43 are respectively provided with connecting rod assisting holes 27 and connecting rod pedal holes 28, the swinging rod lower seat holes 68 and the connecting rod assisting holes 27 are hinged by a hand drive shaft pin 40, and the connecting rod pedal holes 28 and the pedal shaft pins 84 are in rotatable fit;

a rear column seat hole 35 is provided in the upper end of a frame rear column 91, pull rod lower fork holes 22 and a pull rod upper seat hole 24 are respectively provided in the upper and lower ends of a pull rod swinging fork 42, a seat sliding rail 57, sliding rail pin holes 56 and a seat swinging fork 52 are provided on a seat transverse swinging rod 45, and seat fork pin holes 51 are provided in the seat swinging fork 52; the rear column seat hole 35 and the seat rod pin hole 54 are hinged by a seat shaft pin 95; the seat fork pin holes 51 and the pull rod upper seat hole 24 are hinged by a pull rod shaft pin 47, and the pull rod lower fork holes 22 and the pedal shaft pins 84 are in rotatable fit;

the seat cushion assembly 50 is adjustably fixed at the rear end of the seat transverse swinging rod 45.

As a further improvement, the seat cushion assembly 50 further comprises a seat sliding groove 58, sliding groove pin holes 53 and a gravity seat 69, a seat backrest 59 is provided at the rear end of the gravity seat 69, and the included angle between the gravity seat 69 and the seat backrest 59 is an obtuse angle of 115-135 degrees; the seat sliding groove 58 and the seat sliding rail 57 are in sliding fit, the sliding groove pin holes 53 and the sliding rail pin holes 56 are selectively aligned, and the sliding groove pin holes 53 and the sliding rail pin holes 56 are fixedly connected through groove-rail shaft pins 55.

As a further improvement, a frame rear hole seat 39 is provided on the frame oblique column 29, and a spring upper seat hole 32 is provided at the lower end of the frame rear column 91; a pair of rear wheel seat holes 92, a spring lower seat hole 96 and a pair of rear fork swinging arms 93 are provided on the rear wheel fork frame 90, rear fork arm holes 94 are provided in the rear fork swinging arms 93, the rear fork arm holes 94 and the frame rear hole seat 39 are rotatably connected by the rear fork frame shaft pin 99, and a spring buffer 49 is fixed between the spring upper seat hole 32 and the spring lower seat hole 96.

As a further improvement, the cardan joint component 77 consists of the cardan joint upper joint 71, the cardan join lower joint 17 and the cardan joint square block 12, a transverse shaft pin 87 and a longitudinal shaft pin 81 are provided on the cardan joint square block 12, a joint upper pin 75 fixes the cardan joint upper joint 71 at the lower end of the assisting stem 76, a joint upper fork mouth 79 is provided on the cardan joint upper joint 71, a joint upper pin hole 78 is provided in the joint upper fork mouth 79, and the joint upper pin hole 78 and the transverse shaft pin 87 are rotatably fixed; a joint lower pin 14 fixes the cardan joint lower joint 17 at the upper end of the front fork rotating shaft 13, a joint lower fork mouth 19 is provided on the cardan joint lower joint 17, a joint lower pin hole 18 is provided in the joint lower fork mouth 19, and the joint lower pin hole 18 and the longitudinal shaft pin 81 are rotatably fixed.

As a further improvement, middle shaft clamping grooves 26 are symmetrically provided in the two sides of the frame middle shaft 88, middle shaft square columns 82 are provided on the outer sides of the middle shaft clamping grooves 26, middle shaft studs 86 are provided at the outer ends of the middle shaft square columns 82 on the two sides, and a shaft inner clamping ring 61 is located in the middle shaft clamping grooves 26 and used for restricting axial displacement between the frame middle shaft hole 33 and the frame middle shaft 88;

chain wheel center square holes 83 and chain wheel pedal shaft square holes 85 are provided in the single dual chain wheel 80, the pedal shaft pins 84 are fixedly fit on the chain wheel pedal shaft square holes 85; the chain wheel center square holes 83 are fit with the middle shaft square column 82, middle shaft nuts 89 and the middle shaft studs 86 are in tight fit, and the middle shaft nuts 89 block the single dual chain wheel 80;

a pedal shaft shoulder 481 is provided on each pedal shaft pin 84, a pedal fixing screw hole 482 is provided in the outer side end surface of the pedal shaft shoulder 481, and a pedal fixing screw 428 is fit on the pedal fixing screw hole 482; the pedal fixing screw 428 and the pedal fixing screw hole 482 are in tight fit to fix the pedal 48 on the pedal shaft pin 84; a pedal crankshaft surface 483, a pedal square shaft section 485 and a pedal shaft stud 486 are sequentially provided on the inner side of the pedal shaft shoulder 481; a connecting rod pedal hole bush 828 is provided on the connecting rod pedal hole 28, and the inner hole of the connecting rod pedal hole bush 828 and the outer circle of the pedal crankshaft surface 483 are in rotatable sliding fit; a pull rod fork hole bush 822 is provided on the pull rod lower fork hole 22, and the inner hole of the pull rod fork hole bush 822 and the outer circle of the pedal crankshaft surface 483 are in rotatable sliding fit; an isolating slip ring 438 is located between the connecting rod pedal hole bush 828 and the pull rod fork hole bush 822 and is used to eliminate end face interference; a square hole retaining ring 484 is provided between the step of the pedal crankshaft surface 483 and the single dual chain wheel 80 and is used to reduce end face friction; the chain wheel pedal shaft square holes 85 sleeve the pedal square shaft section 485, a pedal nut 468 is fit on the pedal shaft stud 486, and the pedal nut 468 and the pedal shaft stud 486 are in tight fit to fix the single dual chain wheel 80 on the pedal square shaft section 485.

As a further improvement, a layer of titanium alloy hard material with a thickness of 0.38 mm is provided on the outer circle of the pedal crankshaft surface 483, and the titanium alloy hard material consists of the following elements in percentage by weight: 8.5% of titanium, 7.2% of copper, 6.5% of nickel, 5.2% of molybdenum, 3.8% of tungsten, 2.5% of chromium, 0.65% of carbon, 0.8% of zinc, 0.2% of aluminum, and balance of Fe and unavoidable impurities; the impurities comprise the following components in percentage by weight: 0.05% of manganese, 0.02% of silicon, n 0.01% of sulfur and 0.01% of phosphorus, and the Rockwell superficial hardness number of the titanium alloy hard material is HRC65;

the isolating slip ring 438 and the square hole retaining ring 484 are both made of a copper-based powder metallurgy self-lubricating wear-resistant material, which consists of the following components in percentage by mass: 2.8% of nickel, 2.8% of graphite, 2.2% of molybdenum disulfide and balance of copper; the particle size of nickel is 150 meshes, the particle size of graphite is 75 meshes, molybdenum disulfide is colloidal powder with purity of 97%, and the particle size of copper is 150 meshes; and the pressing pressure of the blanks of the isolating slip ring 438 and the square hole retaining ring 484 is 270 MPa.

In the embodiment, the connecting rod pedal hole bush 828 and the pull rod fork hole bush 822 are both self-lubricating bearings on the whole, the assisting stem 76 and the steering handlebar 70 are in an integral structure, and the front brake handle 72 and the rear brake handle 73 are fixedly mounted on the steering handlebar 70; the bicycle front wheel 10 is fixed in the front fork hole seat 16, the front brake 15 is fixed in front of the front wheel fork frame 11, and the front brake 15 and the front brake handle 72 are connected by a brake flexible wire; the bicycle rear wheel 20 is fixed in the rear wheel seat hole 92, the rear brake 25 is fixed below the rear wheel fork frame 90, and the rear brake 25 and the rear brake handle 73 are connected by a rear brake flexible wire; the cardan joint upper joint 71, the cardan joint lower joint 17 and the cardan joint square block 12 are purchased on the whole, the single dual ratchet wheel 21 is provided on at least one side of the bicycle rear wheel 20, the rotating direction of the two single dual ratchet wheels 21 is the same, and the single dual ratchet wheels 21 on the two sides are fixed on the two sides of the hub of the bicycle rear wheel 20 in advance.

The assembling process includes separate assembling of each component and splicing between components.

I. Separate Assembling of Each Component is as Follows:

(I) the front fork rotating shaft 13 penetrates through the sliding sleeve through hole 67, and the joint lower pin 14 fixedly connects the cardan joint lower joint 17 to the upper end of the front fork rotating shaft 13; the assisting stem 76 penetrates through the frame front fork hole 31, and the joint upper pin 75 fixedly connects the cardan joint upper joint 71 to the lower end of the assisting stem 76;

(II) the swinging rod upper hole ring 65 on the assisting swinging rod 46 penetrate through the swinging rod through slot 36 from the bottom to the top, the swinging rod seat hole 66 is aligned with the assisting support hole seat 34, and the swinging rod shaft pin 44 penetrates through the assisting support hole seat 34 and the swinging rod middle seat hole 66 to rotatably fix the swinging rod middle seat hole 66 on the assisting support hole seat 34; the swinging rod upper hole ring 65 is placed in the middle of a pair of sliding sleeve swinging seats 62, the swinging rod upper hole ring 65 is aligned with the sliding sleeve pin hole 63, and the sliding sleeve shaft pin 64 penetrates through the swinging rod upper hole ring 65 and the sliding sleeve pin hole 63 to rotatably fix and connect the swinging rod upper hole ring 65 and the sliding sleeve pin hole 63; the connecting rod assisting hole 27 in the assisting connecting rod 43 is aligned with the swinging rod lower seat hole 68, and the hand drive shaft pin 40 sequentially penetrates through the connecting rod assisting hole 27 and the swinging rod lower seat hole 68 to rotatably connect and fix the connecting rod assisting hole 27 and the swinging rod lower seat hole 68;

(III) the seat rod pin hole 54 is aligned with the rear column seat hole 35, the seat shaft pin 95 penetrates through the seat rod pin hole 54 and the rear column seat hole 35, and the seat transverse swinging rod 45 is rotatably fixed on the frame rear column 91; the pull rod upper seat hole 24 is placed in the middle of a pair of seat swinging forks 52, the pull rod upper seat hole 24 is aligned with the seat fork pin hole 51, and the pull rod shaft pin 47 penetrates through the pull rod upper seat hole 24 and the seat fork pin hole 51 to rotatably fix and connect the pull rod upper seat hole 24 and the seat fork pin hole 24; according to the body and habits of the rider, the sliding groove pin holes 53 and the sliding rail pin holes 56 are selected to be aligned at a proper position, and the sliding groove pin holes 53 and the sliding rail pin holes 56 are fixedly connected by the groove-rail shaft pins 55;

(IV) the frame middle shaft 88 is put into the frame middle shaft hole 33, and the two clamping rings 61 for shaft are respectively put into the middle shaft clamping grooves 26 on the two sides by using special pliers for clamping springs to limit the axial displacement of the frame middle shaft 88 in the frame middle shaft hole 33; the chain wheel center square holes 83 of the two single dual chain wheels 80 are squeezed and mounted on the middle shaft square columns 82 on the two sides, the chain wheel pedal shaft square holes 85 on the two sides are enabled to be on the same axis line, and the middle shaft nuts 89 are tightly fit with the middle shaft studs 86 to fix the single dual chain wheels 80 on the frame middle shaft 88;

(V) two single dual chains 23 are placed on the single dual chain wheels 80 in advance, the pedal crankshaft surface 483 on the pedal shaft pin 84 on one side sequentially penetrates through the inner hole of the connecting rod pedal hole bush 828, the inner hole of the isolating slip ring 438 and the inner hole of the pull rod fork hole bush 822, the square hole of the square hole retaining ring 484 is enabled to sleeve the pedal square shaft section 485, the pedal square shaft section 485 is squeezed into the chain wheel pedal shaft square hole 85, and the pedal nut 468 is tightly fit with the pedal shaft stud 486 to enable the step of the pedal crankshaft surface 483 together with the square hole retaining ring 484 to be attached to the single dual chain wheel 80; the inner hole of the pedal 48 is enabled to sleeve the pedal shaft pin 84, and the pedal fixing screw 428 is tightly fit with the pedal fixing screw hole 482 to rotatably fix the pedal 48 on the pedal shaft pin 84; similarly, the pedal shaft pin 84 on the other side is fixedly connected with the single dual chain wheel 80 in the same way as above;

(VI) the rear fork arm hole 94 is aligned with the frame rear hole seat 39, the rear fork frame shaft pin 99 penetrates through the rear fork arm hole 94 and the frame rear hole seat 39 to rotatably fix the rear fork arm hole 94 on the frame rear hole seat 39, a buffer upper shaft pin rotatably fixes the upper end of a spring buffer 49 on the spring upper seat hole 32, and the buffer lower shaft pin rotatably fixes the lower end of the spring buffer 49 on the spring lower seat hole 96; the single dual chains 23 are respectively placed on the single dual ratchet wheels 21 and the single dual chain wheels 80 to complete the assembling.

Figure 2:
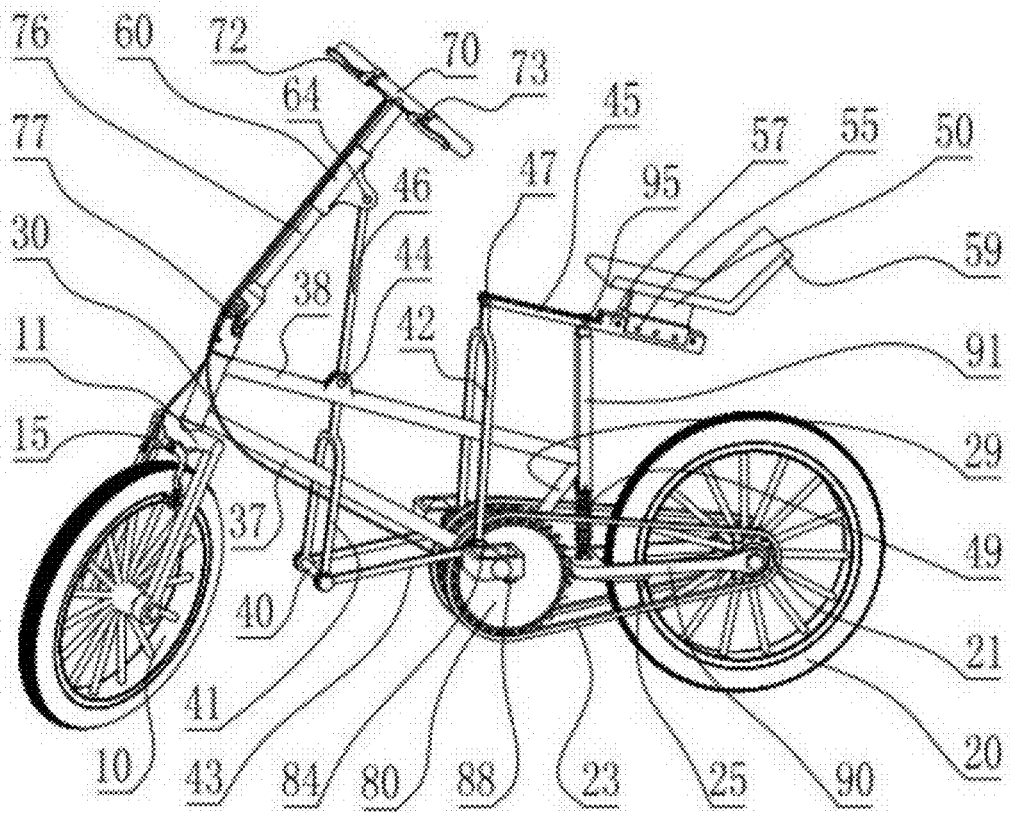
FIG. 2 is a stereoscopic state view of a single dual chain wheel 80 in FIG. 1 after rotated for 45 degrees.
Figure 3:
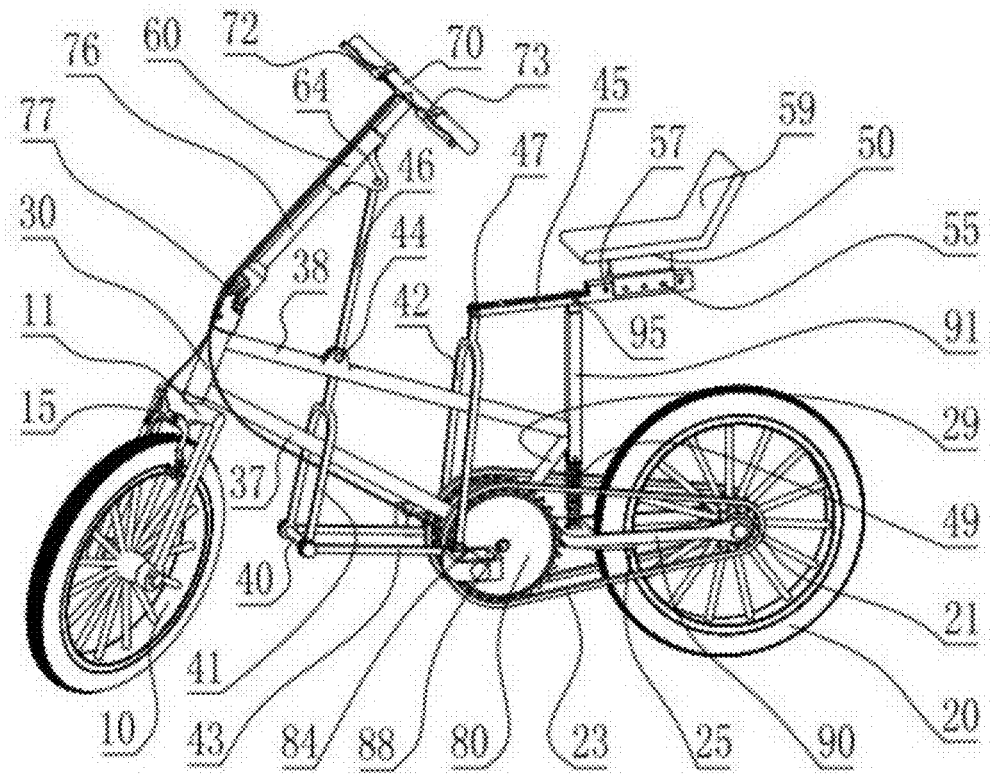
FIG. 3 is a stereoscopic state view of a single dual chain wheel 80 in FIG. 1 after rotated for 90 degrees.
Figure 4:
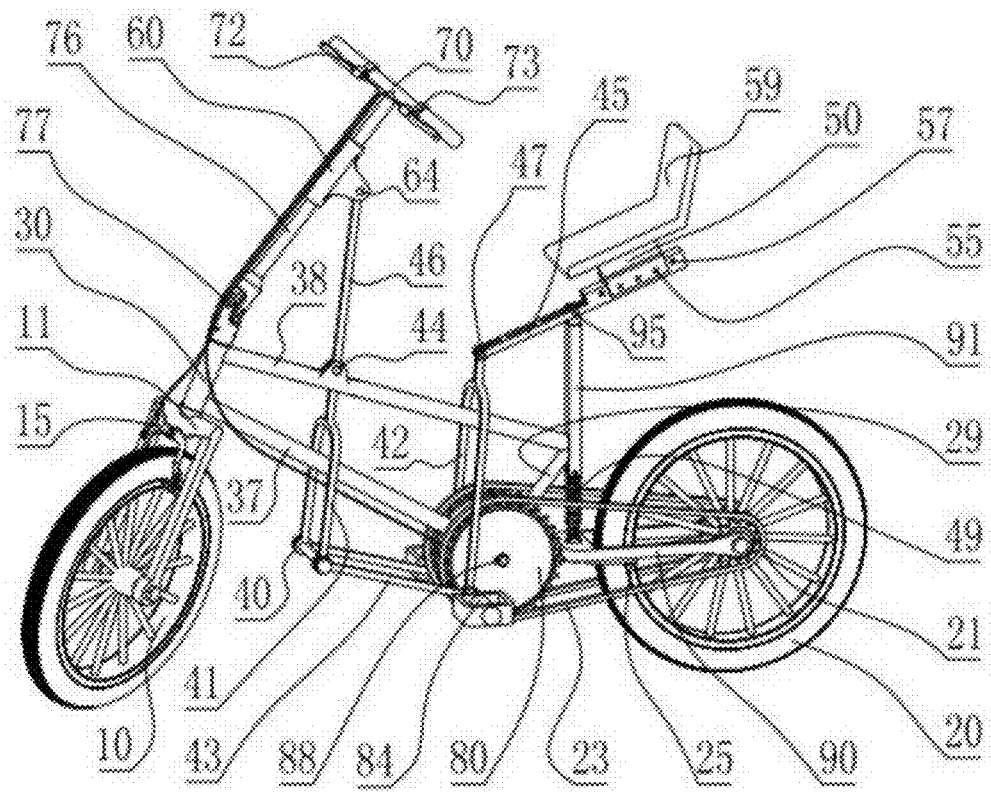
FIG. 4 is a stereoscopic state view of a single dual chain wheel 80 in FIG. 1 after rotated for 135 degrees.
Figure 5:
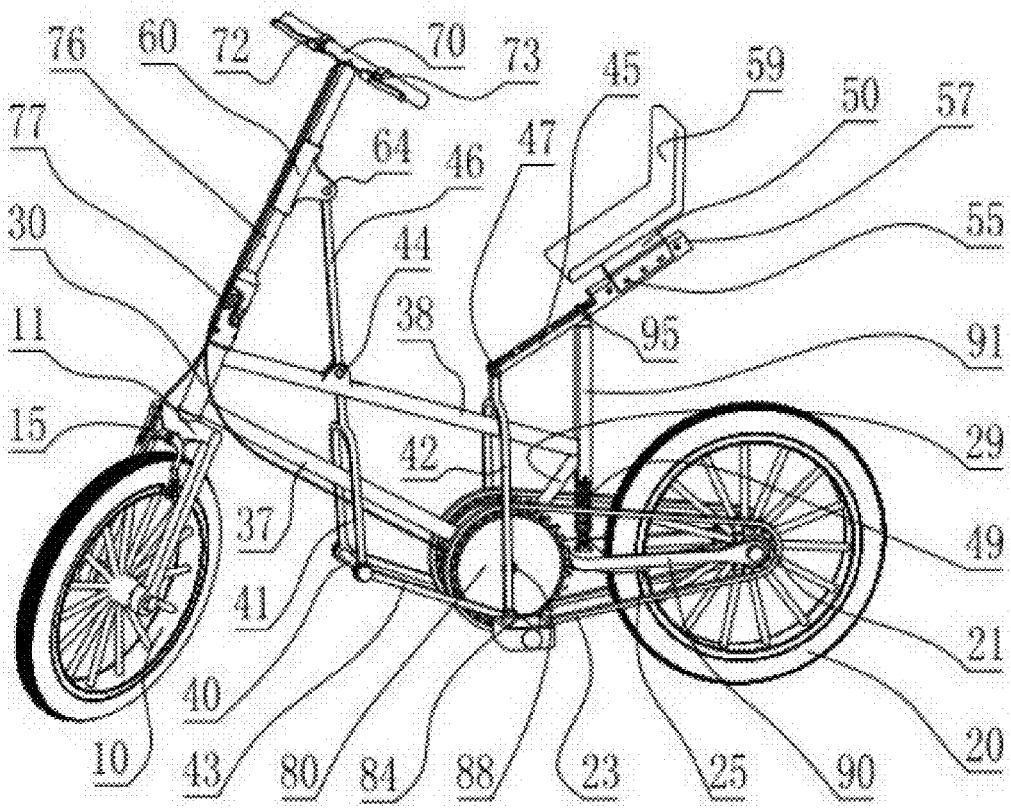
FIG. 5 is a stereoscopic state view of a single dual chain wheel 80 in FIG. 1 after rotated for 180 degrees.
Figure 6:
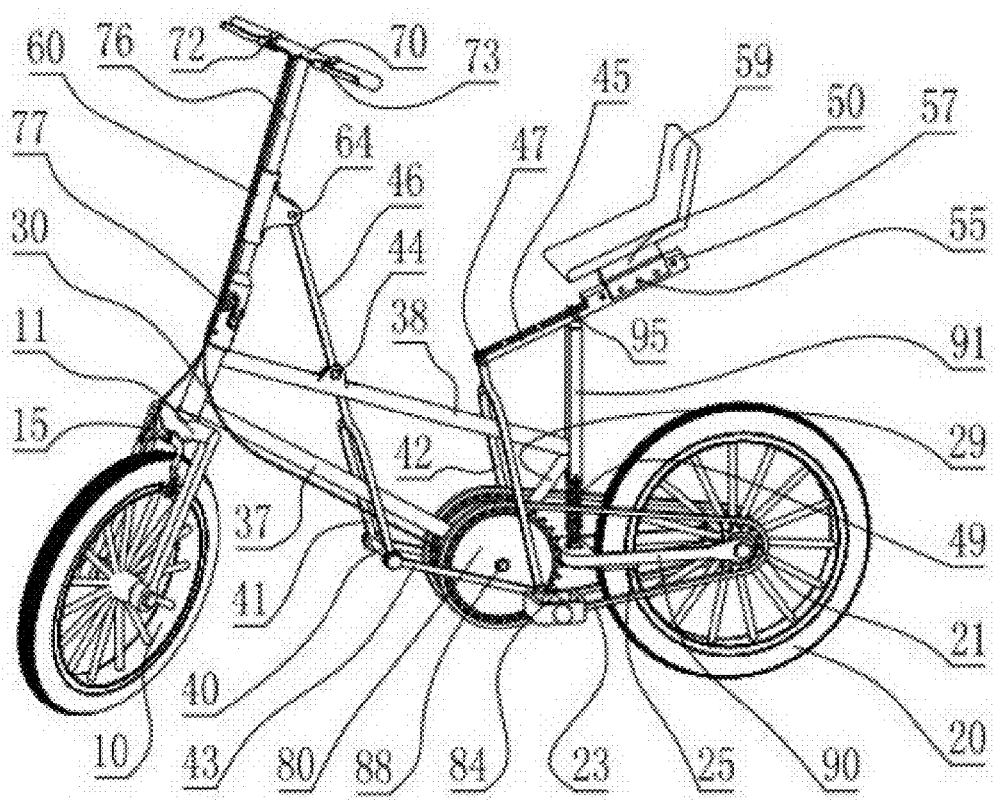
FIG. 6 is a stereoscopic state view of a single dual chain wheel 80 in FIG. 1 after rotated for 225 degrees.
Figure 7:
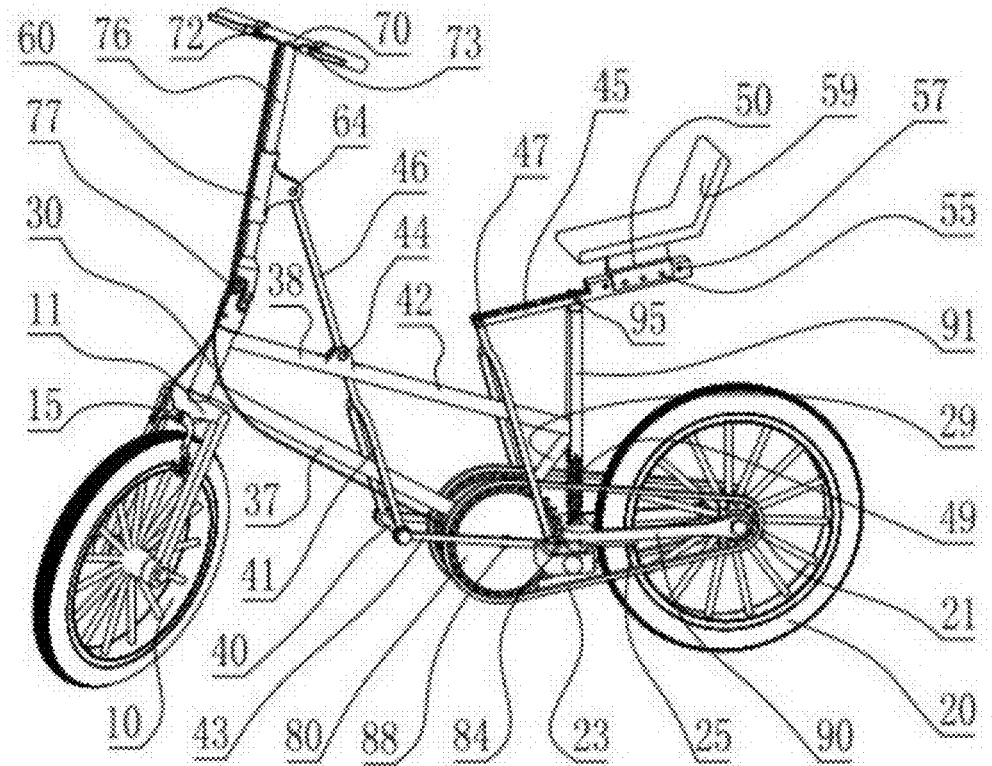
FIG. 7 is a stereoscopic state view of a single dual chain wheel 80 in FIG. 1 after rotated for 270 degrees.
Figure 8:
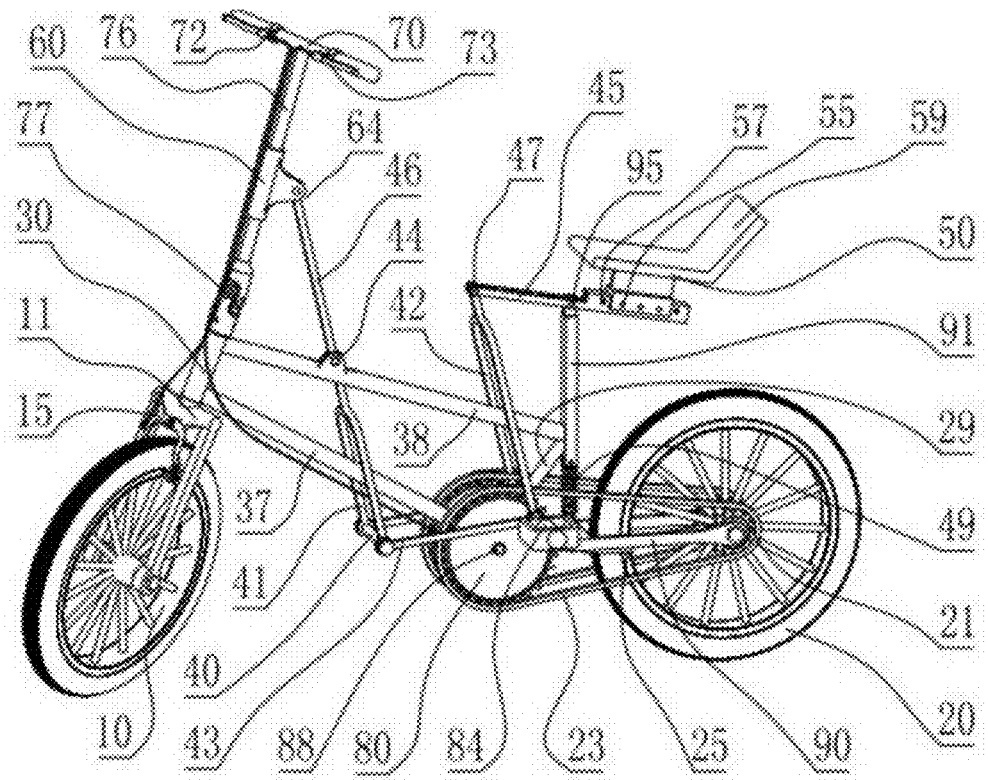
FIG. 8 is a stereoscopic state view of a single dual chain wheel 80 in FIG. 1 after rotated for 315 degrees.
Figure 9:
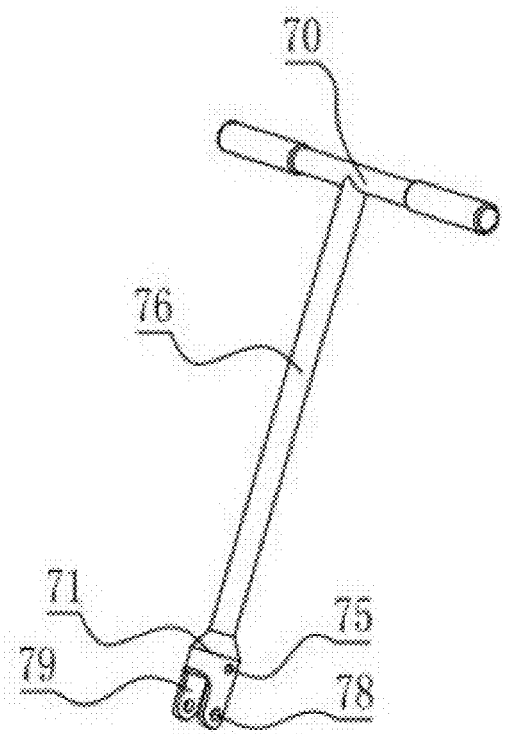
FIG. 9 is a separate stereoscopic view of a steering handlebar 70 in FIG. 1.
Figure 10:
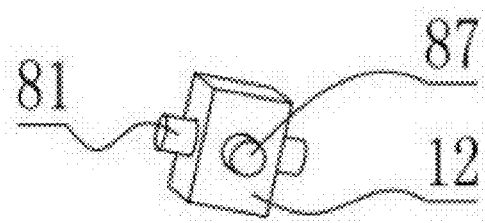
FIG. 10 is a separate stereoscopic view of a cardan joint square block 12.
Figure 11:
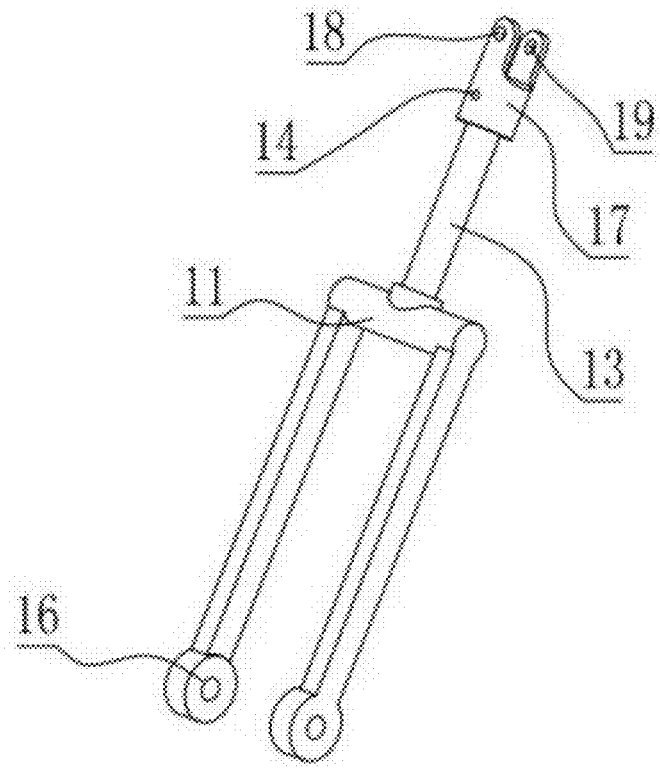
FIG. 11 is a separate stereoscopic view of a front wheel fork frame 11.
Figure 12:
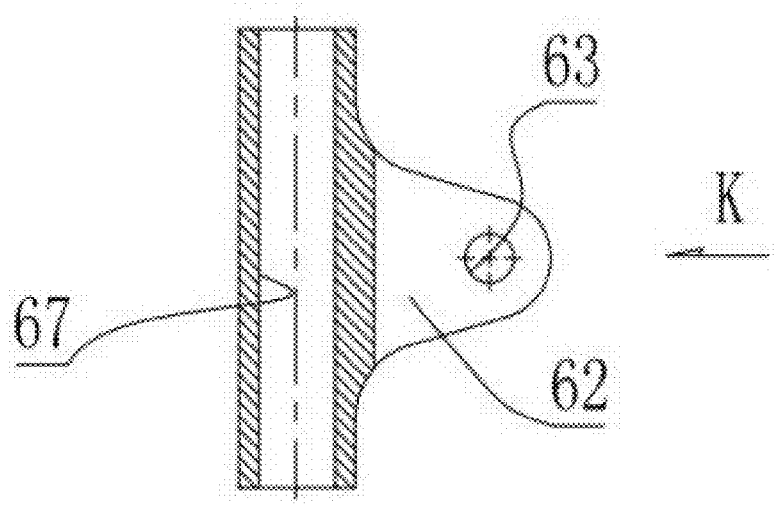
FIG. 12 is a cross-sectional view of an assisting sliding sleeve 60 in FIG. 1.
Figure 13:
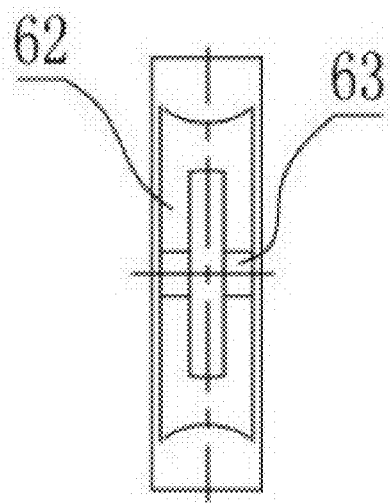
FIG. 13 is a K-direction view in FIG. 12.
Figure 14:
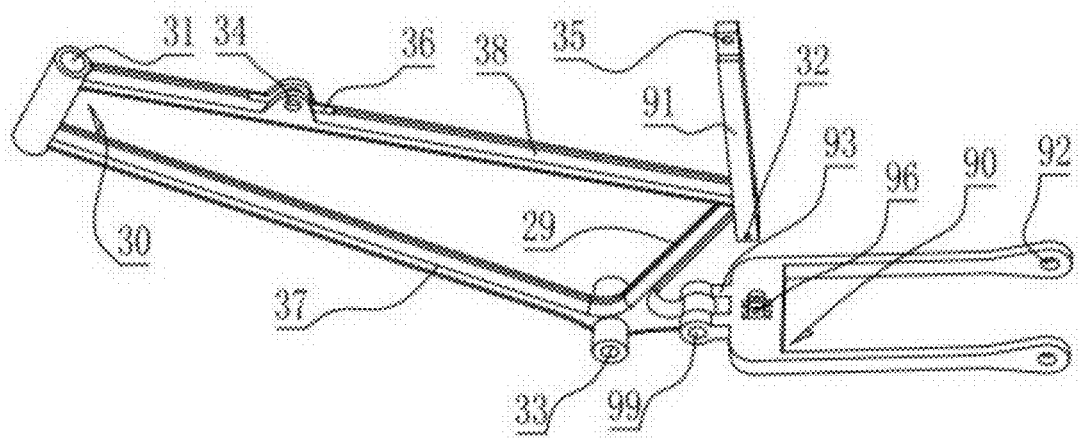
FIG. 14 is a stereoscopic view of a connecting state of a frame body 30 and a rear wheel form frame 90 in FIG. 1.
Figure 15:
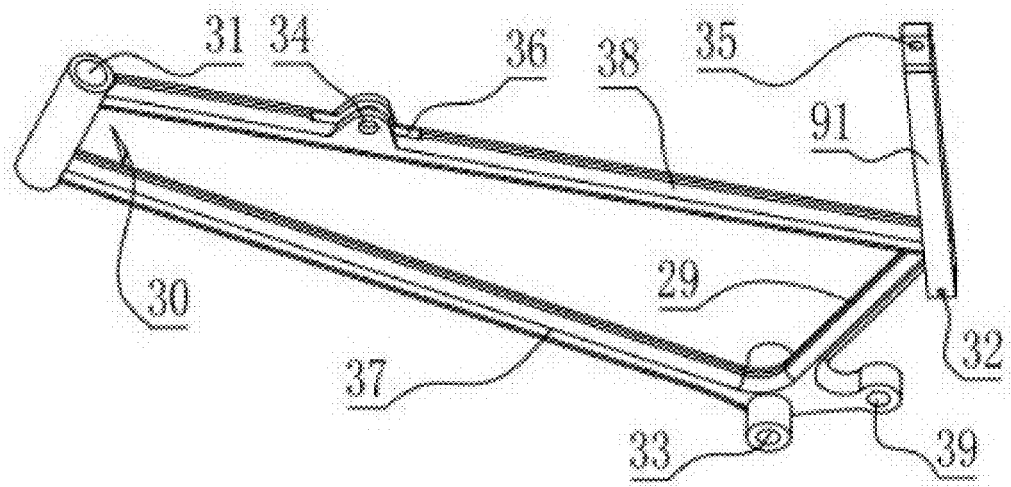
FIG. 15 is a separate stereoscopic view of a frame body 30 in FIG. 14.
Figure 16:
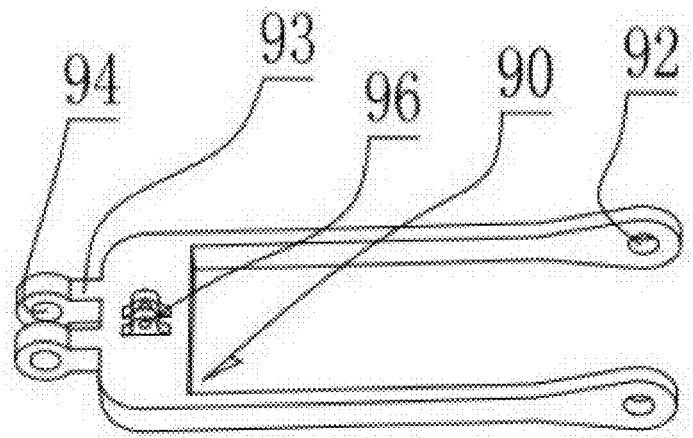
FIG. 16 is a separate stereoscopic view of a rear wheel fork frame 90 in FIG. 14.
Figure 17:
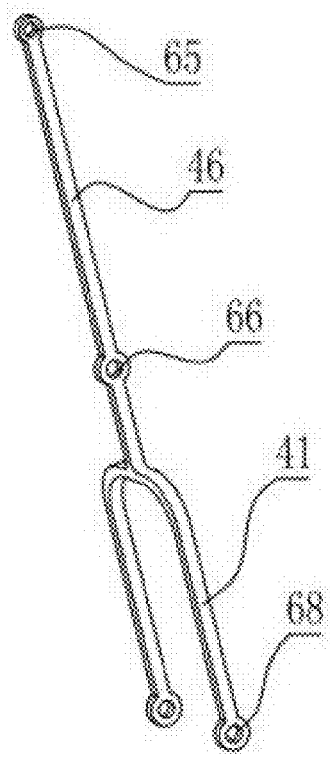
FIG. 17 is a separate stereoscopic view of an assisting swinging rod 46 in FIG. 1.
Figure 18:
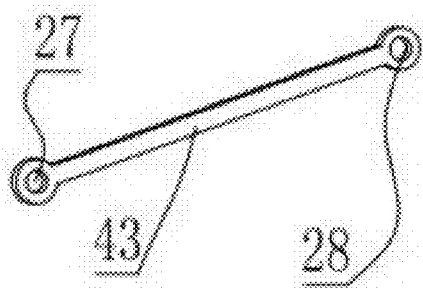
FIG. 18 is a separate stereoscopic view of an assisting connecting rod 43 in FIG. 1.
Figure 19:
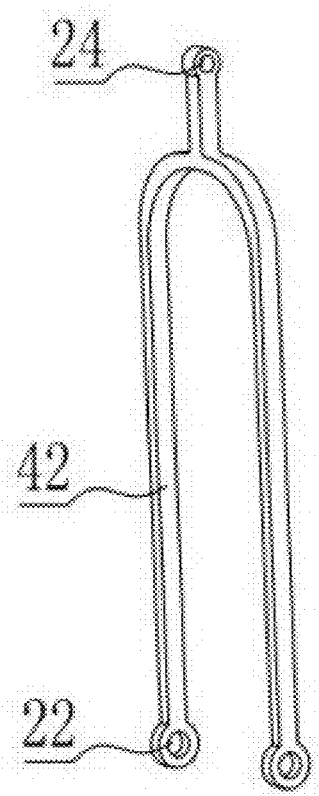
FIG. 19 is a separate stereoscopic view of a pull rod swinging fork 42 in FIG. 1.
Figure 20:
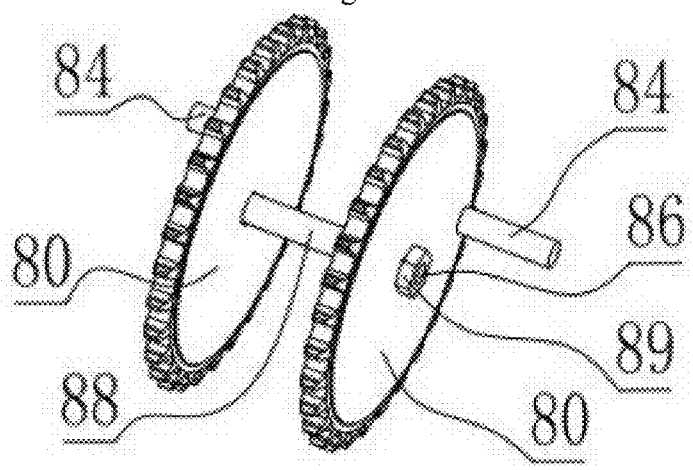
FIG. 20 is a combined stereoscopic view of a single dual chain wheel 80 connected with pedal shaft pins 84 and a frame middle shaft 88 in FIG. 1.
Figure 21:
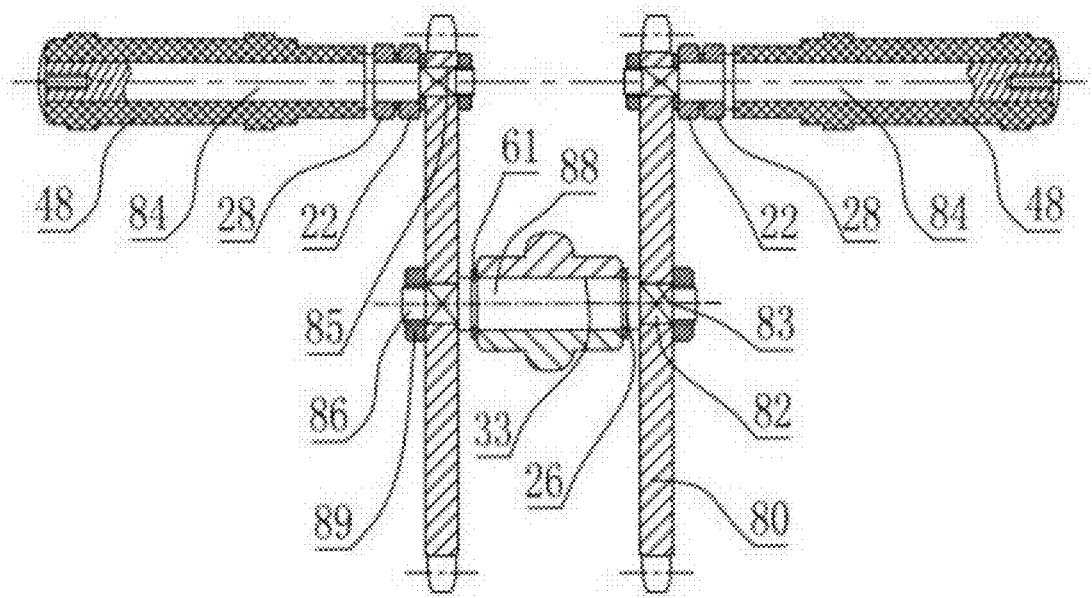
FIG. 21 is a cross-sectional view along the axis line of the pedal shaft pins 84 and the axis line of the frame middle shaft 88 in FIG. 20.
Figure 22:
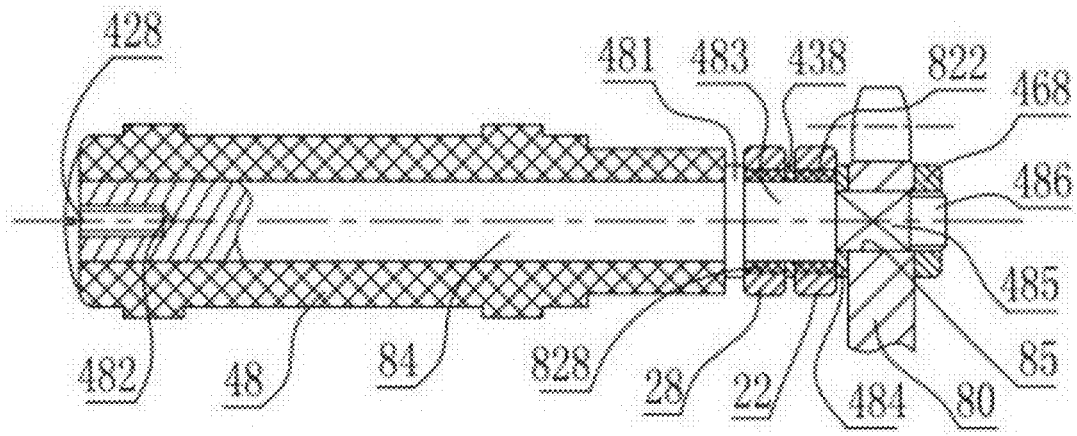
FIG. 22 is an enlarged view of a connecting position between the pedal shaft pins 84 and the a single dual chain wheel 80 in FIG. 21.
Figure 23:
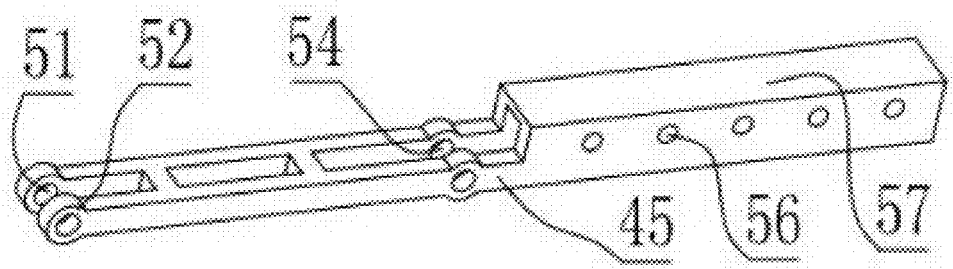
FIG. 23 is a separate stereoscopic view of a seat transverse swinging rod 45 in FIG. 1.
Figure 24:
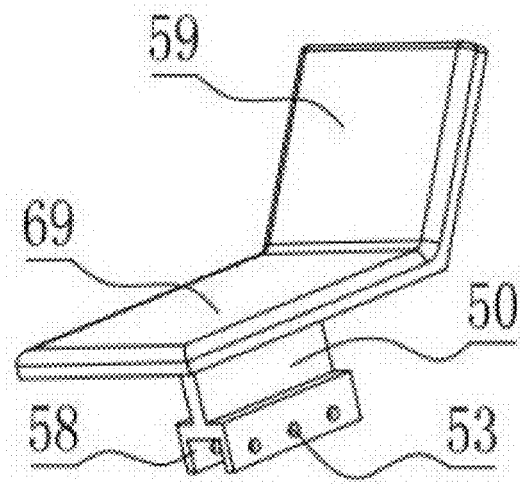
FIG. 24 is a separate stereoscopic view of a seat cushion assembly 50 in FIG. 1.
Figure 25:
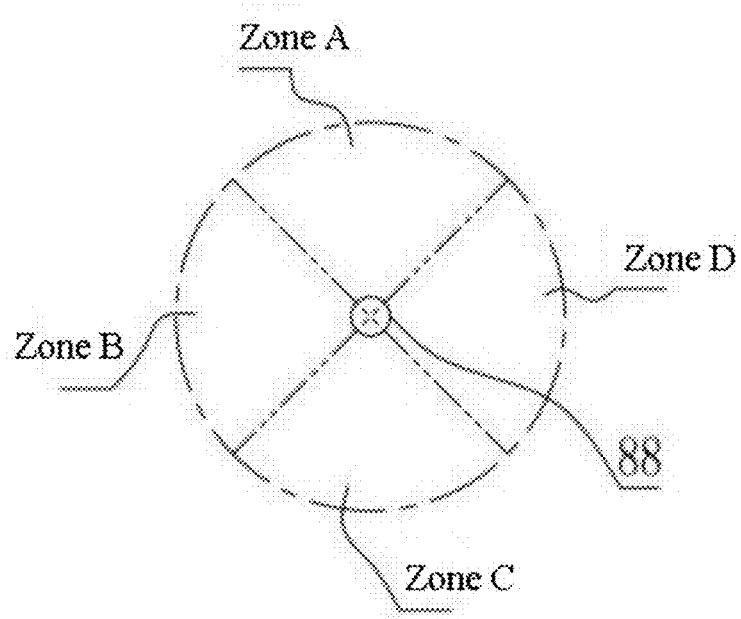
FIG. 25 is a schematic view of zoning of four different acting forces of pedal shaft pins 84 on a single dual chain wheel 80.

Riding Characteristics:

(I) in FIG. 1, when the pedal shaft pin 84 is at the highest position of the movement circumference, it is located in zone A in FIG. 25, the "high position dead point" of the conventional bicycle is met, and no matter which foot is on the pedal shaft pin 84, the rider cannot drive the paired chain wheels 80 to rotate to do work; at the same time, the rider grasps the steering handlebar 70 with the two hands to do backward pulling motion, and the assisting stem 76 is driven to rotate clockwise with the swinging rod shaft pin 44 as a fulcrum; the moving point, i.e., the hand drive shaft pin 40 also rotates clockwise with the swinging rod shaft pin 44 as a fulcrum, the pedal shaft pin 84 together with the single dual chain wheels 80 can be effectively pulled through the assisting connecting rod 43 to rotate anticlockwise with the frame middle shaft 88 as a fulcrum, and the single dual chains 23 drive the single dual ratchet wheels 21 together with the bicycle rear wheel 20 to roll forwards to drive the entire bicycle and the rider to move forwards;

the moving point, i.e., the pull rod shaft pin 47 is driven by the pull rod swinging fork 42 to rotate anticlockwise with the seat shaft pin 95 as a fulcrum, the seat transverse swinging rod 45 together with the seat cushion assembly 50 also rotates anticlockwise with the seat shaft pin 95 as a fulcrum, and thus a powerful pushing force is given to the rider to stand up at a next time;

(II) in FIG. 2, when the pedal shaft pin 84 is at the forward upward position of the movement circumference, it is near the junction of zone A and zone B in FIG. 25, with the help of the two hands' pulling force and the driving force of the seat cushion assembly 50, the rider has applied the body gravity to the pedal shaft pin 84 through one foot, with the help of the reaction force of the seat backrest 59, when the rider uses one leg to do work downwards, there is a forward component to better drive the pedal shaft pin 84 and the single dual chain wheels 80 to rotate anticlockwise with the frame middle shaft 88 as a fulcrum; at the same time, the two hands of the rider hold the steering handlebar 70 make a backward pulling motion, the moving point, i.e., the sliding sleeve shaft pin 64 rotates clockwise with the swinging rod shaft pin 44 as a fulcrum, the moving point, i.e., the hand drive shaft pin 40 also rotates clockwise with the swinging rod shaft pin 44 as a fulcrum, the pedal shaft pin 84 together with the single dual chain wheel 80 is driven jointly through the assisting connecting rod 43 to rotate anticlockwise with the frame middle shaft 88 as a fulcrum, the single dual chains 23 drive the single dual ratchet wheels 21 together with the bicycle rear wheel 20 to roll forwards, the entire bicycle together with the rider is driven to move forwards, and thus the smooth transfer from the work done by the two hands to the work done by the body gravity is realized;

the moving point, i.e., the pull rod shaft pin 47 is continuously driven by the pull rod swinging fork 42 to rotate anticlockwise with the seat shaft pin 95 as a fulcrum, and the seat transverse swinging rod 45 together with the seat cushion assembly 50 rotates anticlockwise with the seat shaft pin 95 as a fulcrum;

(III) in FIG. 3, when the pedal shaft pin 84 is at the most front position of the movement circumference, it is located in zone B in FIG. 25, and the assisting connecting rod 43 also encounters the "front end dead point" of the "crank and connecting rod mechanism"; the acting force applied by the two hands holding the steering handlebar 70 to the pedal shaft pin 84 through the assisting connecting rod 43 cannot drive the single dual chain wheels 80 to rotate to do work; at the same time, the gravity of the rider from top to bottom acts on the pedal shaft pin 84 through a single foot at the highest efficiency, the pedal shaft pin 84 together with the single dual chain wheel 80 is driven to rotate anticlockwise with the frame middle shaft 88 as a fulcrum, and the single dual chains 23 drive the single dual ratchet wheels 21 together with the bicycle rear wheel 20 to roll forwards, and the entire bicycle together with the rider is driven to move forwards; the moving point, i.e., the sliding sleeve shaft pin 64 rotates with the swinging rod shaft pin 44 as a fulcrum and is at the turning point from clockwise rotation to anticlockwise rotation; the moving point, i.e., the hand drive shaft pin 40 also rotates with the swinging rod shaft pin 44 as a fulcrum and is at the turning point from clockwise rotation to anticlockwise rotation;

the moving point, i.e., the pull rod shaft pin 47 is continuously driven by the pull rod swinging fork 42 to rotate anticlockwise with the seat shaft pin 95 as a fulcrum, and the seat transverse swinging rod 45 together with the seat cushion assembly 50 rotates anticlockwise with the seat shaft pin 95 as a fulcrum;

(IV) in FIG. 4, when the pedal shaft pin 84 is at the forward lower position of the movement circumference, it is near the junction of zone B and zone C in FIG. 25, the gravity of the rider continuously drives the pedal shaft pin 84 together with the paired chain wheels 80 to rotate anticlockwise with the frame middle shaft 88 as a fulcrum through the single foot placed on the pedal shaft pin 84, at the same time, the two hands of the rider change to hold the steering handlebar 70 to start to push forwards, and the assisting stem 76 is driven to rotate anticlockwise with the cardan joint component 77 as a fulcrum; the moving point, i.e., the sliding sleeve shaft pin 64 rotates anticlockwise with the swinging rod shaft pin 44 as a fulcrum, the moving point, i.e., the hand drive shaft pin 40 also rotates anticlockwise with the swinging rod shaft pin 44 as a fulcrum, the pedal shaft pin 84 together with the single dual chain wheels 80 is driven jointly through the assisting connecting rod 43 to rotate anticlockwise with the frame middle shaft 88 as a fulcrum, the symmetric chains 23 drive the single dual ratchet wheels 21 together with the bicycle rear wheel 20 to roll forwards, and the entire bicycle together with the rider is driven to move forwards to realize the smooth transfer from the work done by the body gravity to the work done by the two hands;

the moving point, i.e., the pull rod shaft pin 47 is continuously driven by the pull rod swinging fork 42 to rotate anticlockwise with the seat shaft pin 95 as a fulcrum, and the seat transverse swinging rod 45 together with the seat cushion assembly 50 also rotates anticlockwise with the seat shaft pin 95 as a fulcrum;

(V) in FIG. 5, when the pedal shaft pin 84 is at the lowest position of the movement circumference, it is located in zone C in FIG. 25, and no matter which foot is on the pedal shaft pin 84, the rider cannot drive the single dual chain wheels 80 to rotate to do work; at the same time, the rider grasps the steering handlebar 70 with the two hands to do forward pushing motion, the moving point, i.e., the sliding sleeve shaft pin 64 rotates anticlockwise with the swinging rod shaft pin 44 as a fulcrum, the moving point, i.e., the hand drive shaft pin 40 also rotates anticlockwise with the swinging rod shaft pin 44 as a fulcrum. the pedal shaft pin 84 together with the single dual chain wheels 80 can be effectively pushed through the assisting connecting rod 43 to rotate anticlockwise with the frame middle shaft 88 as a fulcrum, and the single dual chains 23 drive the single dual ratchet wheels 21 together with the bicycle rear wheel 20 to roll forwards to drive the entire bicycle and the rider to move forwards;

the moving point, i.e., the pull rod shaft pin 47 is at the turning point from anticlockwise rotation to clockwise rotation; the seat transverse swinging rod 45 together with the seat cushion assembly 50 is also at the turning point from anticlockwise rotation to clockwise rotation, and thus it facilitates the sitting-down action done by the rider;

(VI) In FIG. 6, when the pedal shaft pin 84 is at the rear lower position of the movement circumference, it is near the junction of zone C and zone D in FIG. 25, the rider sits on the seat cushion assembly 50 with the help of the pushing force of the two hands and the gravity of the upper body, and the body gravity arm is enabled to produce a greater clockwise torque with the help of the seat backrest 59 to drive the seat transverse swinging rod 45 to rotate clockwise with the seat shaft pin 95 as a fulcrum; the pedal shaft pin 84 together with the single dual chain wheels 80 is started to be lifted through the pull rod swinging fork 42 to rotate anticlockwise with the frame middle 88 as a fulcrum; at the same time, the rider continuously holds the steering handlebar 70 with the two hands to make the forward pushing motion, the moving point, i.e., the sliding sleeve shaft pin 64 rotates anticlockwise with the swinging rod shaft pin 44 as a fulcrum, the moving point, i.e., the hand drive shaft pin 40 also rotates anticlockwise with the swinging rod shaft pin 44 as a fulcrum, the pedal shaft pin 84 together with the single dual chain wheels 80 is driven jointly through the assisting connecting rod 43 to rotate anticlockwise with the frame middle shaft 88 as a fulcrum, the single dual chains 23 drive the single dual ratchet wheels 21 together with the bicycle rear wheel 20 to roll forwards, and the entire bicycle together with the rider is driven to move forwards to realize the smooth transfer from the work done by the two hands to the work done by the upper body gravity;

(VII) in FIG. 7, when the pedal shaft pin 84 is at the most rear position of the movement circumference, it is located in zone D in FIG. 25, and the assisting connecting rod 43 also encounters the "front end dead point" of the "crank and connecting rod mechanism"; the acting force applied by the two hands holding the steering handlebar 70 to the pedal shaft pin 84 through the assisting connecting rod 43 cannot drive the single dual chain wheels 80 to rotate to do work; at the same time, the upper body gravity of the rider acts on the seat cushion assembly 50, and the seat transverse swinging rod 45 is driven to rotate clockwise with the seat shaft pin 95 as a fulcrum; and the pedal shaft pin 84 together with the single dual chain wheels 80 is driven efficiently through the pull rod swinging fork 42 to rotate anticlockwise with the frame middle shaft 88 as a fulcrum; the single dual chains 23 drive the single dual ratchet wheels 21 together with the bicycle rear wheel 20 to roll forwards, and the entire bicycle together with the rider is driven to move forwards;

the moving point, i.e., the sliding sleeve shaft pin 64 is at the turning point from anticlockwise rotation to clockwise rotation with the swinging rod shaft pin 44 as a fulcrum; the moving point, i.e., the hand drive shaft pin 40 is also at the turning point from anticlockwise rotation to clockwise rotation with the swinging rod shaft pin 44 as a fulcrum; (VIII) in FIG. 8, when the pedal shaft pin 84 is at the rear upper position of the movement circumference, it is near the junction of zone D and zone A in FIG. 25, and the upper body gravity of the rider also acts on the seat cushion assembly 50 and continuously drives the seat transverse swinging rod 45 to rotate clockwise with the seat shaft pin 95 as a fulcrum; the pedal shaft pin 84 together with the single dual chain wheels 80 is continuously pulled through the pull rod swinging fork 42 to rotate anticlockwise with the frame middle shaft 88 as a fulcrum; at the same time, the rider holds the steering handlebar 70 with the two hands to start to pull backwards, the moving point, i.e., the sliding sleeve shaft pin 64 rotates clockwise with the swinging rod shaft pin 44 as a fulcrum, the moving point, i.e., the hand drive shaft pin 40 also rotates clockwise with the swinging rod shaft pin 44 as a fulcrum, the pedal shaft pin 84 together with the single dual chain wheels 80 is driven jointly through the assisting connecting rod 43 to rotate anticlockwise with the frame middle shaft 88 as a fulcrum, the symmetric chains 23 drive the single dual ratchet wheels 21 together with the bicycle rear wheel 20 to roll forwards, and the entire bicycle together with the rider is driven to move forwards to realize the smooth transfer from the work done by the body gravity to the work done by the two hands; finally, the single dual chain wheels 80 can be efficiently driven to rotate at any position of the movement circumference of the pedal shaft pin 84.

(IX) When it is necessary needed to turn in the process of riding, the steering handlebar 70 is held with two hands to turn round to enable the center of the assisting stem to rotate, the front fork rotating shaft 13 is driven through the cardan joint component 77 to rotate in the frame front fork hole 31, and then the front wheel fork frame 11 drives the bicycle front wheel 10 to rotate to realize the purpose of turning during riding. Since the sliding sleeve through hole 67 is in sliding fit with the assisting stem 76, when the assisting stem 76 turns round, it will not drive the assisting sliding sleeve 60 to rotate; moreover, when the assisting stem 76 rotates forwards and backwards, the assisting sliding sleeve 60 can move axially relative to the assisting stem 76, and the assisting sliding sleeve 60 rotates up and down with the sliding sleeve shaft pin 64 as a center, and also rotates forwards and backwards along with the assisting swinging, with the swinging rod shaft pin 44 as a center.

The rider fully uses the strength of the whole body and achieves the whole body movement alternately between standing up and lowering down during riding. At the same time, the two hands alternately push and pull for assisting to eliminate the "low position dead point" and "high position dead point" of the conventional bicycle. Pushing and pulling for assisting by the two hands alternately, in combination with the alternate whole body movement by standing up and lowering down, achieve the continuous work-doing effect by non-dead-point movement and achieve the purpose of efficient and fast riding.

The above prominent substantive features of the present invention bring about the following remarkable progress effects:

(I) Since the cardan joint component 77 is provided between the upper end of the front fork rotating shaft 13 and the lower end of the assisting stem 76, in combination with the sliding fit between the sliding sleeve through hole 67 in the assisting sliding sleeve 60 and the assisting stem 76, the assisting swinging rod 46 and the swinging rod lower fork 41 can be driven to rotate clockwise or anticlockwise with the swinging rod shaft pin 44 as a fulcrum, the assisting connecting rod 43 drives the pedal shaft pin 84 and the single dual chain wheels 80 to rotate with the frame middle shaft 88 as a fulcrum, and a creative role is played at the "high position dead point" and "low position dead point" of the conventional bicycles; by providing the cardan joint component 77, the rider can use two hands to hold the steering handlebar 70 to push forwards or pull backwards, it will not obstruct the front wheel from turning left or right at any time, and the effect that the two hands participate in doing work is realized; in particular, by acting on the seat cushion assembly 50 through the body gravity, the seat transverse swinging rod 45 and the seat cushion assembly 50 can rotate anticlockwise with the seat shaft pin 95 as a fulcrum, the pull rod swinging fork 42 is driven to be "lifted up", and the pedal shaft pin 84 and the single dual chain wheels 80 can rotate anticlockwise with the frame middle shaft 88 as a fulcrum; the limit that the positions of the two pedals of the conventional bicycle must have a difference of 180 degrees, which requires a second foot to pedal downwards to make up the defect that the first foot cannot apply force to lift up the two pedals is overcome, it does need the two feet to apply force alternately and it provides a possibility for the one-leg disabled to ride the bicycle.

(II) Since the seat transverse swinging rod 45 rotates clockwise or anticlockwise with the seat shaft pin 95 as a fulcrum, and the pull rod swinging fork 42 pulls the pedal shaft pin 84 and the single dual chain wheels 80 to rotate upwards with the frame middle shaft 88 as a fulcrum, in combination with the gravity of the rider which acts on the pedal shaft pin 84 through one leg, the pedal shaft pin 84 and the single dual chain wheels 80 are driven to rotate downwards with the frame middle shaft 88 as a fulcrum, the gravity produced when the body stands upright and lowers down and the pushing and pulling force of the two hands transfer smoothly, the joint force is given to the pedal shaft pins 84 to drive the single dual chain wheels 80 to rotate, and not only can the purpose of improving the riding speed be achieved and are the pedal shaft pins 84 on two sides located on the same axis line, but also the left and right shaking caused by the alternating application of force by the left and right feet of the traditional bicycle is thoroughly eliminated; and moreover, since the actions that one leg stands upright and the hip lowers down are performed alternately, in combination with the perfect combination of the pushing and pulling force of the two hands, it also achieves the fitness effect of exercising the abdominal muscles and the entire body.

(III) Since the pedal crankshaft surface 483 is provided between the pedal shaft shoulder 481 and the pedal square shaft section 485 on the pedal shaft pin 84, and the inner hole of the connecting rod pedal hole bush 828 and the inner hole of the pull rod fork hole bush 822 are in rotatable sliding fit with the outer circle of the pedal crankshaft surface 483, it is easy and smooth to ride the bicycle; since the square hole retaining ring 484 is provided between the step of the pedal crankshaft surface 483 and the single dual chain wheels 80, the end friction can be effectively reduced; and since the isolating slip ring 438 is provided between the connecting rod pedal hole bush 828 and the pull rod fork hole bush 822, it is ensured that end face interference does not occur.

(IV) Since the sliding groove pin holes 53 and the sliding rail pin holes 56 can be selectively aligned and are fixed by the groove rail shaft pins 55, the seat cushion assembly 50 can be moved forwards and backwards, adjusted and fixed on the seat transverse swinging rod 45, and thus it is suitable for people with different arm length to ride.

(V) Since a layer of titanium alloy hard material is provided on the outer circle of the pedal crankshaft surface 483, it is ensured that the pedal crankshaft surface 483 is more wear-resistant; since the isolating slip ring 438 and the square hole retaining ring 484 are both made of a copper-based powder metallurgy self-lubricating wear-resistant material, the end friction can be effectively reduced; and it is lighter and quicker to ride.

(VI) The work done jointly by the hands and feet in the present invention is great, the speed is naturally fast, and the force on the chains is also increased. The advantages of the paired chain wheels 80 in combination with the single dual chains 23 and the single dual ratchet wheels 21 on one at least one side of the bicycle rear wheel 20 are that the model size of the chains is particularly enhanced, it is convenient for the selection of standard parts, and in case that the chain on one side is broken, the bicycle can still be ridden to the maintenance point or destination, the situation that the bicycle needs to be pushed to move because "the chain falls off" on the half way is avoided, and this is especially important for the one-leg disabled.

The invention claimed is:

1. A cardan joint steering titanium alloy hand and foot cooperatively operated bicycle capable of being ridden with one leg, comprising a bicycle front wheel, a front wheel fork frame, a bicycle rear wheel, a frame body, a seat cushion assembly, a steering handlebar, a single dual chain wheel and a rear wheel fork frame, a frame front fork hole and a frame middle shaft hole being provided in the frame body, and a frame middle shaft being rotatably fixed in the frame middle shaft hole, wherein an upper end of a front fork rotating shaft and a lower end of an assisting stem are connected through a cardan joint component, a single dual ratchet wheel is provided on at least one side of the bicycle rear wheel, the single dual chain wheel is fixed to at least one side of the frame middle shaft, pedal shaft pins are symmetrically provided on the outer sides of the single dual chain wheel, and the single dual chain wheel and the single dual ratchet wheel are connected through a single dual chain; the lower end of the assisting stem is fixedly connected with a cardan joint upper joint, the upper end of the front fork rotating shaft is fixedly connected with a cardan joint lower joint, and a cardan joint square block is movably fixed between the cardan joint lower joint and the cardan joint upper joint;

a swinging rod through slot and an assisting support hole seat are provided on a frame upper beam, a swinging rod middle seat hole, a swinging rod upper hole ring and a swinging rod lower fork are provided on an assisting swinging rod, and swinging rod lower seat holes are provided in the swinging rod lower fork; the swinging rod upper hole ring penetrates through the swinging rod through slot, and a swinging rod shaft pin penetrates through the swinging rod middle seat hole and fixes the swinging rod middle seat hole on the assisting support hole seat; a sliding sleeve through hole and a pair of sliding sleeve swinging seats are provided on an assisting sliding sleeve, a sliding sleeve pin hole is provided in each sliding sleeve swinging seat, the sliding sleeve pin hole and the swinging rod upper hole ring are hinged by a sliding sleeve shaft pin, and the sliding sleeve through hole and the assisting stem are in sliding fit; front and rear ends of an assisting connecting rod are respectively provided with connecting rod assisting holes and connecting rod pedal holes, the swinging rod lower seat holes and the connecting rod assisting holes are hinged by a hand drive shaft pin to pivotally connecting the swinging rod lower fork and the assisting connecting rod, and the connecting rod pedal holes of the assisting connecting rod and one of the pedal shaft pins on the single dual chain wheel are in rotatable fit;

a rear column seat hole is provided in an upper end of a frame rear column, pull rod lower fork holes and a pull rod upper seat hole are respectively provided in the upper and lower ends of a pull rod swinging fork, a seat sliding rail, sliding rail pin holes and a seat swinging fork are provided on a seat transverse swinging rod, and seat fork pin holes are provided in the seat swinging fork; the rear column seat hole and the seat rod pin hole are hinged by a seat shaft pin; the seat fork pin holes and the pull rod upper seat hole are hinged by a pull rod shaft pin, and the pull rod lower fork holes of the pull rod swinging fork and another of the pedal shaft pins on the single dual chain wheel are in rotatable fit;

the seat cushion assembly is adjustably fixed at a rear end of a seat transverse swinging rod.

2. The cardan joint steering titanium alloy hand and foot cooperatively operated bicycle capable of being ridden with one leg according to claim 1, wherein the front wheel fork frame comprises a front fork hole seat and a front fork rotating shaft, a front brake handle and a rear brake handle are respectively fixed on two sides of the steering handlebar, and the assisting stem is provided at a lower end of the steering handlebar; the front brake handle is connected to a front brake through a front brake flexible wire, and the front brake is fixed on the front wheel fork frame; the rear brake handle is connected to a rear brake through a rear brake flexible wire, and the rear brake is fixed on the rear wheel fork frame.

3. The cardan joint steering titanium alloy hand and foot cooperatively operated bicycle capable of being ridden with one leg according to claim 1, wherein the seat cushion assembly further comprises a seat sliding groove, sliding groove pin holes and a gravity seat, the gravity seat with a seat backrest is provided at the rear end of the gravity seat, and the gravity seat is connected to the seat backrest at an angle of 115-135 degrees; the seat sliding groove and the seat sliding rail are in sliding fit, the sliding groove pin holes and the sliding rail pin holes are selectively aligned, and the sliding groove pin holes and the sliding rail pin holes are fixedly connected through groove-rail shaft pins.

4. The cardan joint steering titanium alloy hand and foot cooperatively operated bicycle capable of being ridden with one leg according to claim 1, wherein the cardan joint component consists of the cardan joint upper joint, the cardan join lower joint and the cardan joint square block, a transverse shaft pin and a longitudinal shaft pin are provided on the cardan joint square block, a joint upper pin fixes the cardan joint upper joint at the lower end of the assisting stem, a joint upper fork mouth is provided on the cardan joint upper joint, a joint upper pin hole is provided in the joint upper fork mouth, and the joint upper pin hole and the transverse shaft pin are rotatably fixed; a joint lower pin fixes the cardan joint lower joint at the upper end of the front fork rotating shaft, a joint lower fork mouth is provided on the cardan joint lower joint, a joint lower pin hole is provided in the joint lower fork mouth, and the joint lower pin hole and the longitudinal shaft pin are rotatably fixed.

5. The cardan joint steering titanium alloy hand and foot cooperatively operated bicycle capable of being ridden with one leg according to claim 1, wherein middle shaft clamping grooves are symmetrically provided in the two sides of the frame middle shaft, middle shaft square columns are provided on an outer sides of the middle shaft clamping grooves, middle shaft studs are provided at the outer ends of the middle shaft square columns on the two sides, and a shaft inner clamping ring is located in the middle shaft clamping grooves and used for restricting axial displacement between the frame middle shaft hole and the frame middle shaft; chain wheel center square holes and chain wheel pedal shaft square holes are provided in the single dual chain wheel, and the pedal shaft pins are fixedly fit on the chain wheel pedal shaft square holes; the chain wheel center square holes are fit with the middle shaft square column, middle shaft nuts and the middle shaft studs are in tight fit, and the middle shaft nuts block the single dual chain wheel;

a pedal shaft shoulder is provided on each pedal shaft pin, a pedal fixing screw hole is provided in the outer side end surface of the pedal shaft shoulder, and a pedal fixing screw is fit on the pedal fixing screw hole the pedal fixing screw and the pedal fixing screw hole are in tight fit to fix the pedal on the pedal shaft pin; a pedal crankshaft surface, a pedal square shaft section and a pedal shaft stud are sequentially provided on an inner side of the pedal shaft shoulder; a connecting rod pedal hole bush is provided on the connecting rod pedal hole, and an inner hole of the connecting rod pedal hole bush and an outer circle of the pedal crankshaft surface are in rotatable sliding fit; a pull rod fork hole bush is provided on the pull rod lower fork hole, and an inner hole of the pull rod fork hole bush and the outer circle of the pedal crankshaft surface are in rotatable sliding fit; an isolating slip ring is located between the connecting rod pedal hole bush and the pull rod fork hole bush and is used to eliminate end face interference; a square hole retaining ring is provided between a step of the pedal crankshaft surface and the single dual chain wheel and is used to reduce an end face friction; the chain wheel pedal shaft square holes sleeve the pedal square shaft section, a pedal nut is fit on the pedal shaft stud, and the pedal nut and the pedal shaft stud are in tight fit to fix the single dual chain wheel on the pedal square shaft section.

6. The cardan joint steering titanium alloy hand and foot cooperatively operated bicycle capable of being ridden with one leg according to claim 1, wherein a layer of titanium alloy hard material with a thickness of 0.37-0.39 mm is provided on the outer circle of the pedal crankshaft surface, and the titanium alloy hard material consists of the following elements in percentage by weight: 8.4-8.6% of titanium, 7.1-7.3% of copper, 6.4-6.6% of nickel, 5.1-5.3% of molybdenum, 3.7-3.9% of tungsten, 2.4-2.6% of chromium, 0.64-0.66% of carbon, 0.7-0.9% of zinc, 0.1-0.3% of aluminum, and balance of Fe and unavoidable impurities; the impurities comprise the following components in percentage by weight: less than 0.08% of manganese, less than 0.005% of silicon, less than 0.06% of sulfur and less than 0.04% of phosphorus, and a Rockwell superficial hardness number of the titanium alloy hard material is HRC64-66;

the isolating slip ring and the square hole retaining ring are both made of a copper-based powder metallurgy self-lubricating wear-resistant material, which consists of the following components in percentage by mass: 2.7-2.9% of nickel, 2.4-2.6% of graphite, 2.1-2.3% of molybdenum disulfide and balance of copper; a particle size of nickel is 140 meshes, a particle size of graphite is 70-80 meshes, molybdenum disulfide is colloidal powder with purity of 96%-98%, and a particle size of copper is 140-160 meshes; and a pressing pressure of the blanks of the isolating slip ring and the square hole retaining ring is 260-280 MPa.

\* \* \* \* \*